United States Patent
Hong et al.

(10) Patent No.: US 6,212,376 B1
(45) Date of Patent: Apr. 3, 2001

(54) METHODS FOR INHIBITING AND ALLOWING ALARM HANDLING IN A DIGITAL CELLULAR SYSTEM

(75) Inventors: Seok-Joo Hong; Jeong-Yong Moon, both of Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/188,832

(22) Filed: Nov. 9, 1998

(30) Foreign Application Priority Data

Nov. 7, 1997 (KR) ................................. 97-58858

(51) Int. Cl.⁷ ...................................... H04Q 7/20
(52) U.S. Cl. ........................ 455/423; 455/424; 455/561
(58) Field of Search ................. 455/9, 67.1, 67.4, 455/67, 7, 404, 418, 419, 423, 424, 446, 560, 561; 340/825.15, 825.16, 825.36, 825.47, 825.49, 825.72; 379/37, 38, 39; 701/29, 35

(56) References Cited

U.S. PATENT DOCUMENTS

| | | | |
|---|---|---|---|
| 4,577,182 | * | 3/1986 | Millsap et al. ...................... 340/539 |
| 4,825,457 | * | 4/1989 | Lebowitz ............................. 379/40 |
| 4,993,059 | * | 2/1991 | Smith et al. .......................... 379/39 |
| 5,892,447 | * | 4/1999 | Wilkinson ........................... 455/67.7 |
| 5,930,707 | * | 7/1999 | Vambaris et al. .................... 455/424 |
| 6,002,928 | * | 12/1999 | Yoon et al. .......................... 455/423 |
| 6,011,967 | * | 1/2000 | Wieck ................................. 455/404 |
| 6,025,779 | * | 2/2000 | Huang ................................. 455/404 |
| 6,032,037 | * | 2/2000 | Jeffers ................................ 455/404 |
| 6,049,273 | * | 4/2000 | Hess ................................... 340/539 |
| 6,091,950 | * | 7/2000 | Remy ................................. 455/423 |

* cited by examiner

Primary Examiner—Dwayne D. Bost
Assistant Examiner—Quang Vu
(74) Attorney, Agent, or Firm—Dilworth & Barrese, LLP (57) ABSTRACT

Methods are provided for inhibiting and allowing alarm handling and displaying when an alarm is inhibited in a digital cellular system. A method for inhibiting alarm handling in a digital cellular system includes the step of inputting an Inhibit Alarm On/Off (INH-ALM-ONOFF) command in a base station manager (BSM). The range of the system to inhibit alarm handling and the type of alarm to be inhibited is set up. An option of inputted variables corresponding to the steps of setting up the range and the type of the alarm are checked. A state of equipment of program loaded data (PLD) is checked to determine whether one of a component group and components groups of the digital cellular system corresponding to the range is in use. It is then determined whether the alarm has occurred. Counts are reduced by as many times as occurrences of the alarm and clearing the alarm, when the alarm has occurred. It is then determined whether the alarm is performed with an Inhibit Alarm Message (INH-ALM-MSG). A "clear" message is displayed, when the alarm is not performed with the INH-ALM-MSG. Graphic data located at a position where the alarm has occurred is recovered by updating the graphic data. A result to which the INH-ALM-ONOFF command is applied is stored to a file to display the result when a Display Alarm On/Off (DIS-ALM-ONOFF) command is performed.

11 Claims, 7 Drawing Sheets

| PRESENT STATE | RESULT STATE | INH-ALM-ONOFF | INH-ALM-MSG |
|---|---|---|---|
| THE EXISTING ALARM HANDLING IS INHIBITED | MESSAGE WINDOW | CLEARED | NOT CLEARED |
| | DIS-ALM-STS & ALARM COUNT | UPDATED | NOT UPDATED |
| | GRAPHIC DISPLAY | UPDATED | NOT UPDATED |
| | STATISTICS | UPDATED | UPDATED |
| THE RESEULT OF THE INHIBITED ALARM IS CHANGED | MESSAGE WINDOW | NOT UPDATED | NOT UPDATED |
| | DIS-ALM-STS & ALARM COUNT | NOT UPDATED | UPDATED |
| | GRAPHIC DATA | NOT UPDATED | UPDATED |
| | STATISTICS | NOT UPDATED | UPDATED |

METHODS FOR INHIBITING AND ALLOWING ALARM HANDLING IN A DIGITAL CELLULAR SYSTEM

BACKGROUND OF THE INVENTION

1. Field of the Invention

The present invention relates generally to cellular communication systems and, in particular, to methods for inhibiting and allowing alarm handling in a digital cellular system.

2. Description of the Related Art

The prior art of the present field includes a method for providing an alarm to a manager (i.e., administrator) after recognizing the alarm. However, a method is not disclosed in the prior art to prevent or inhibit an alarm which does not have to be provided to an administrator. Rather, the prior art discloses a function for preventing the digital cellular system from working and for providing alarm data to an upper system, when an alarm has been initiated. However, this function was implemented as a hardware method and not a software method. Further, the prior art does not include a method performed by an upper alarm handling block for handling an alarm which is frequently active due to an inadequate hardware configuration or system instability.

As a result of the above described inconvenience, whenever the notice inhibition occurred through graphic data or a message window, the administrator had to inhibit the corresponding alarm by modifying the program, and then re-compiling the program in order to locate the generated execution file in the base station manager (BSM).

A function disclosed in the prior art and referred to as an inhibit alarm message (INH-ALM-MSG) only inhibits the display to the message window. The display is informed concurrently to the administrator and the statistics storing the graphic data, the audible alarm, the occurrence number of the alarm, and the results of the occurrence of the alarm.

Some of the problems with the prior art methods and systems will now be described. First, when an alarm occurs frequently and is cleared, messages regarding the occurrence and clearing of the alarm are displayed via the message window while an audible alarm continues ringing. This makes it difficult for the administrator to find other problems. Second, whenever the administrator requested that the developer inhibit the corresponding alarm handling, the developer had to modify the program or control the hardware. The frequent modification of the program and the application of various execution files to the system on a case-by-case basis rendered the management of the program a difficult task for the developer. Third, the allowance of an inhibited alarm handling required the same amount of work as the inhibition of the alarm handling, thereby causing severe inconvenience. Fourth, cognizance of the procedure for inhibiting alarm handling was not easily ascertainable by the administrator and the developer. The developer had to manage all the situations which arose on a case-by-case basis. Therefore, the administrator and the developer had to endure the inconvenience and difficulties of managing the system and the program. Fifth, the INH-ALM-MSG only inhibits the simultaneous display of alarm messages to the message window, rather than whole or complete alarm handling. Accordingly, it would be desirable and highly advantageous for a method to be provided that displays alarm handling information in the administrator's command language to enable the administrator and the developer to easily manage the system and the program, respectively.

SUMMARY OF THE INVENTION

It is an object of the present invention to provide a method for displaying alarm handling information in the administrator's command language to enable the administrator and the developer to easily manage the system and the program, respectively.

In one aspect of the invention, a method for inhibiting alarm handling in a digital cellular system comprises the steps of: inputting an Inhibit Alarm On/Off (INH-ALM-ONOFF) command in a base station manager (BSM); setting up the range of the system to inhibit alarm handling; setting up the type of alarm to be inhibited; checking an option of inputted variables corresponding to said steps of setting up the range and the type of the alarm; checking a state of equipment of program loaded data (PLD) to determine whether or not a component group or components groups of the digital cellular system corresponding to the range is in use; determining whether or not the alarm has occurred; reducing counts by as many times as occurrences of the alarm and clearing the alarm, when the alarm has occurred; determining whether or not the alarm is performed with an Inhibit Alarm Message (INH-ALM-MSG); displaying a "clear" message, when the alarm is not performed with the INH-ALM-MSG; recovering graphic data located at a position where the alarm has occurred by updating the graphic data; and storing a result to which the INH-ALM-ONOFF command is applied to a file to display the result when a Display Alarm On/Off (DIS-ALM-ONOFF) command is performed.

These and other objects, features and advantages of the present invention will become apparent from the following detailed description of illustrative embodiments thereof, which is to be read in connection with the accompanying drawings, where the same reference numerals are used to represent the same functional elements.

DETAILED DESCRIPTION OF PREFERRED EMBODIMENTS

Figure 1:
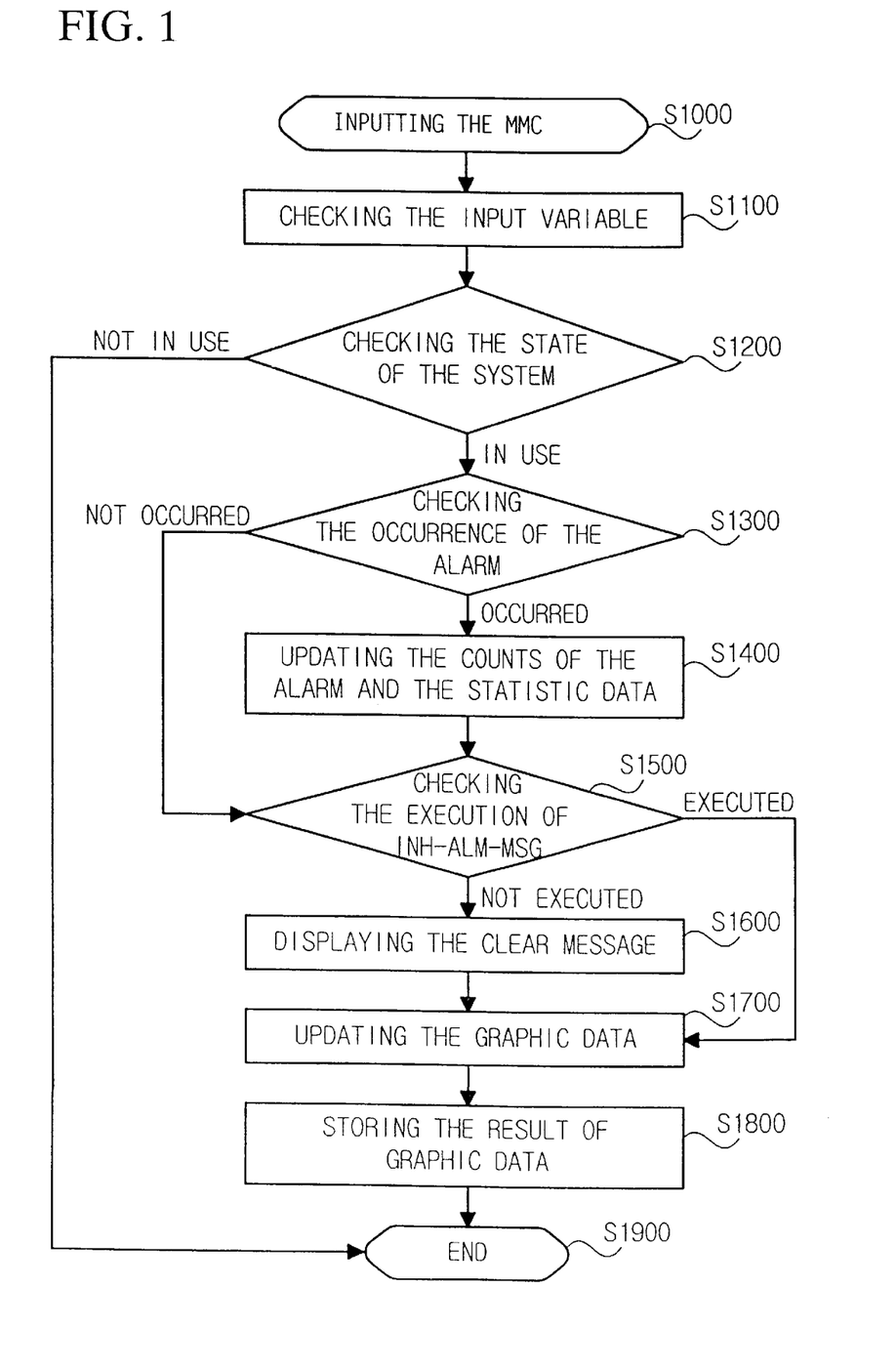
FIG. 1 is a flow chart of a method for inhibiting alarm handling in a digital cellular system according to an embodiment of the present invention.

Referring to FIG. 1, a method is provided for inhibiting alarm handling in a digital cellular system according to an embodiment of the present invention. The method is performed by an upper alarm handling block referred to as a fault management (FLM) block. Further, the method is performed in the case when an Inhibit Alarm On/Off (INH-ALM-ONOFF) command is applied. The method includes the step of inputting a man machine command (MMC) (i.e., the INH-ALM-ONOFF command) to a base station manager (BSM) (step 1000). Then, the range of the system to inhibit alarm handling is setup, the type of alarm to be inhibited is set up, and an option of the inputted variables corresponding to the setting up of the range and the type of the alarm is checked (step 1100). The range of the system to inhibit alarm handling corresponds to a component group or groups (e.g., BSC, BCP, BTS) of the digital cellular system (as well as the entire system itself) whose alarms are to be inhibited. The option of the inputted variables corresponds to the specific components within a group (e.g., the eleventh BSC) whose alarms are to be inhibited. The range and option are discussed in further detail with respect to FIG. 4. The state of equipment of program loaded data (PLD) is checked to determine whether or not the component group (or groups) corresponding to the range is in use (step 1200). That is, the state of equipment of PLD is checked to determine whether or not the component group (or groups) to perform commands corresponding to the alarm handling (e.g., BSC, BCP, BTS) is in use.

It is then determined whether or not the alarm to be inhibited has occurred, when the system to perform the commands is in use (step 1300). Counts corresponding to every occurrence of the alarm are reduced and the alarm is cleared, when the alarm to be inhibited has occurred (step 1400). Next, it is determined whether or not the alarm was performed with an Inhibit Alarm Message (INH-ALM-MSG) (step 1500). A "clear" message is displayed, when the alarm was not performed with the INH-ALM-MSG (step 1600). Next, graphic data located at a position where the alarm has occurred is recovered by updating the graphic data (step 1700). Then, a result to which the Inhibit Alarm On/Off (INH-ALM-ONOFF) command is applied is stored to a file in order to display the result, when a Display Alarm On/Off (DIS-ALM-ONOFF) command is performed (step 1800).

If it is determined at step 1200 that the system to perform the commands corresponding to the alarm handling is not in use, then the method (i.e., the INH-ALM-ONOFF process) is terminated (step 1900). Further, if it is determined at step 1300 that the alarm to be inhibited had not occurred, then the method proceeds to step 1500 to check whether or not the alarm was performed with the INH-ALM-MSG. If it is determined at step 1500 that the alarm was performed with the INH-ALM-MSG, then the method proceeds to step 1700 to recover the graphic data located at the position where the alarm has occurred by updating the graphic data.

When intending to inhibit the existing alarm handling, the method of the present invention clears the corresponding alarm and reflects the result to the graphic data, statistics, and the counts of the occurrences of the alarm. After all the commands are performed, if the alarm is provided to a fault management (FLM) block, the fact of whether or not the INH-ALM-ONOFF was applied is read from the file and then checked. If the INH-ALM-ONOFF was applied, then the file is discarded.

Figure 4:
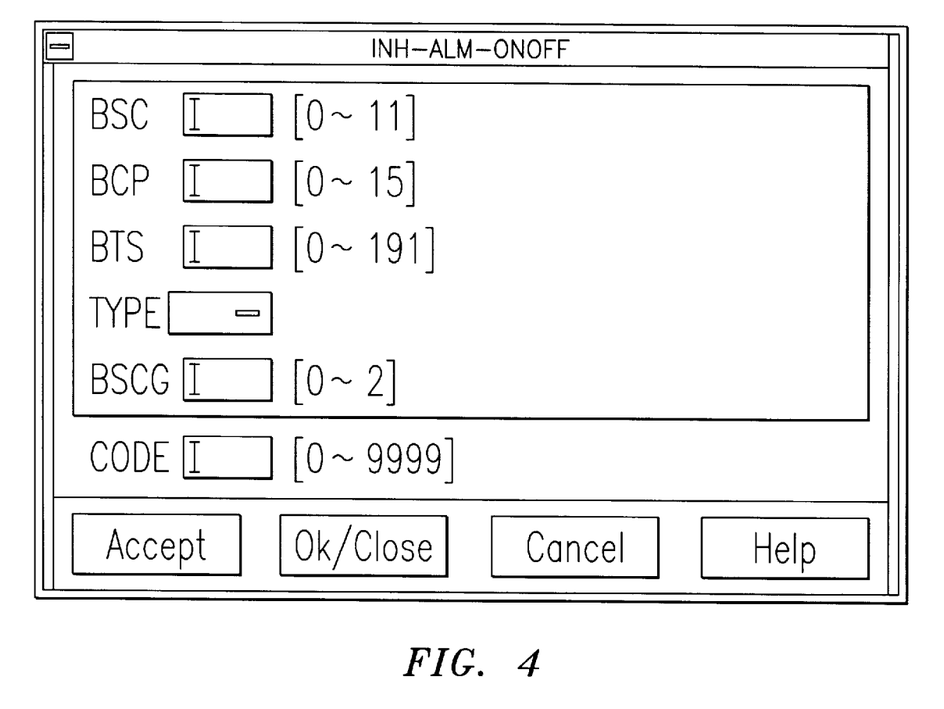
FIG. 4 is a diagram illustrating a message window when an Inhibit Alarm On/Off (INH-ALM-ONOFF) command is applied according to an embodiment of the present invention.

Referring to FIG. 4, a diagram is shown illustrating a message window when an Inhibit Alarm On/Off (INH-ALM-ONOFF) command is applied according to an embodiment of the present invention. The TYPE button corresponds to the range of the system to inhibit alarm handling, which is set at step 1100. In order to inhibit the alarm handling with respect to the entire system, "all" is selected in the TYPE button. In order to inhibit alarm handling with respect to a BSC common (BSCC) alarm, "BSCC" is selected in the TYPE button. The BSCC alarm corresponds to the device and processor which are commonly equipped with a CDMA BSS System (CBS) which, in turn, is associated with twelve BSCs.

The boxes shown in FIG. 4 (i.e., BSC, BCP, BTS and BSCG) correspond to the option checked at step 1100. That is, the TYPE button allows for the alarm handling of a component group to be inhibited (e.g., all BSCs), while the BSC, BCP, BTS and BSCG boxes allow for the alarm handling of a specific(s) BSC, BCP, BTS and BSCG to be inhibited. To inhibit all of the alarms of a specific BSC, BCP or BTS, the corresponding BSC, BCP or BTS value is respectively inputted to the BSC, BCP or BTS box. The BTS value may also be computed using $BSC\_ID \times 16 + BCP\_ID$. Additionally, to inhibit all of the alarms of a specific BSC group (BSCG), the corresponding BSCG value is inputted to the BSCG box. The BSCG alarm corresponds to the device and processor which are commonly equipped with the (CDMA BSS System) (CBS) which, in turn, is associated with four BSCs. Thus, to inhibit a specific alarm using the above described procedure, the corresponding alarm code is inputted to the code box.

Figure 2:
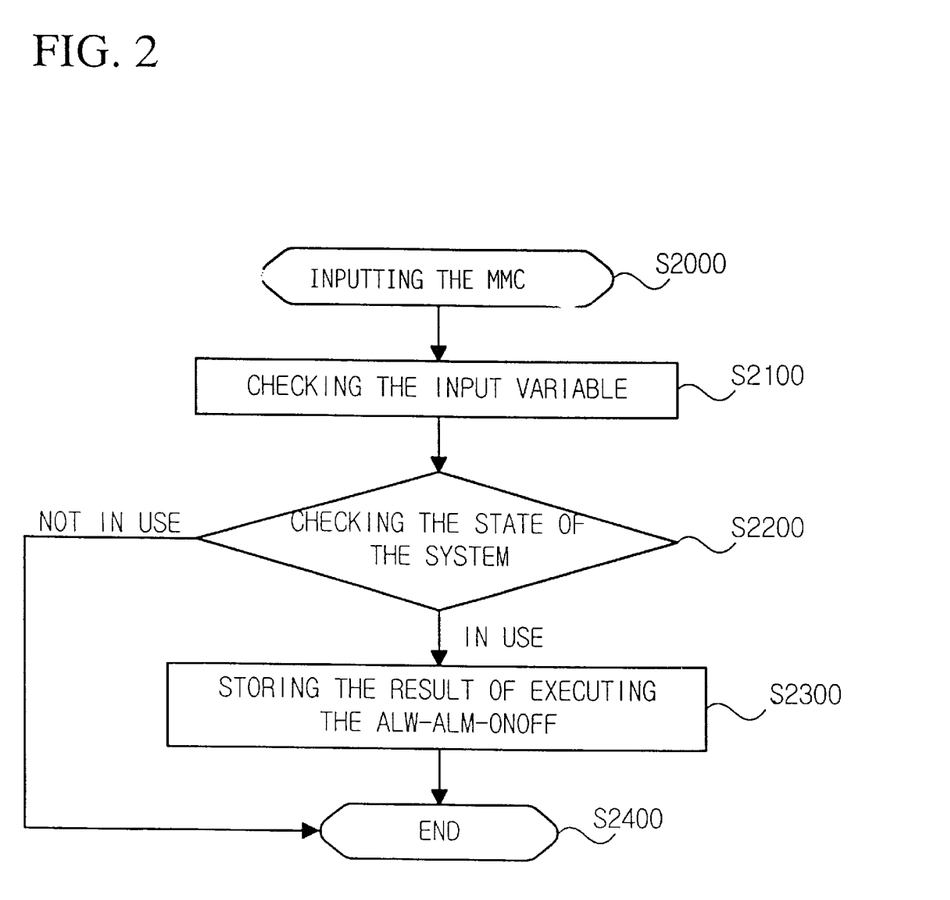
FIG. 2 is a flow chart of a method for allowing alarm handling in a digital cellular system according to an embodiment of the present invention.

Referring to FIG. 2, a method is provided for allowing alarm handling in a digital cellular system according to an embodiment of the present invention. The method of FIG. 2 is performed by the fault management (FLM) block in the case when an Allowance Alarm On/Off (ALW-ALM-ONOFF) command is applied. The method includes the step of inputting a man machine command (MMC) (i.e., the ALW-ALM-ONOFF command) to a base station manager (BSM) (step 2000). The range of the system to allow alarm handling and the type of alarm to be allowed are setup, and an option of the inputted variables corresponding to the setting up of the range and the type of the alarm is checked (step 2100). The range of the system to allow alarm handling corresponds to a component group or groups (e.g., BSC, BCP, BTS) of the digital cellular system (as well as the entire system itself) whose alarms are to be allowed. The option of the inputted variables corresponds to the specific components within a group (e.g., the eleventh BSC) whose alarms are to be allowed. The range and option are discussed in further detail with respect to FIG. 5. The state of equipment of program loaded data (PLD) is checked to determine whether or not the component group (or groups) corresponding to the range is in use (step 2200). That is, the state of equipment of PLD is checked to determine whether or not the component group (or groups) to perform commands corresponding to inhibiting the alarm handling is in use. A result of performing an Allowance Alarm On/Off (ALW-ALM-ONOFF) command is stored, when the system is in use (step 2300). However, the method (i.e., the ALW-ALM-ONOFF process) is terminated, when the system is not in use (step 2400).

According to the present invention, inhibiting and allowing of alarm handling is performed by the administrator by easily inputting the commands to the BSM. In the case that the administrator wants to display the inhibited result, the same procedure is executed, and all command inputting is performed utilizing the MMC.

After the algorithm is executed, the state goes to the previous state where the INH-ALM-ONOFF command is not performed. That is, normal alarm handling is performed according to the result of executing the ALW-ALM-ONOFF command.

Figure 5:
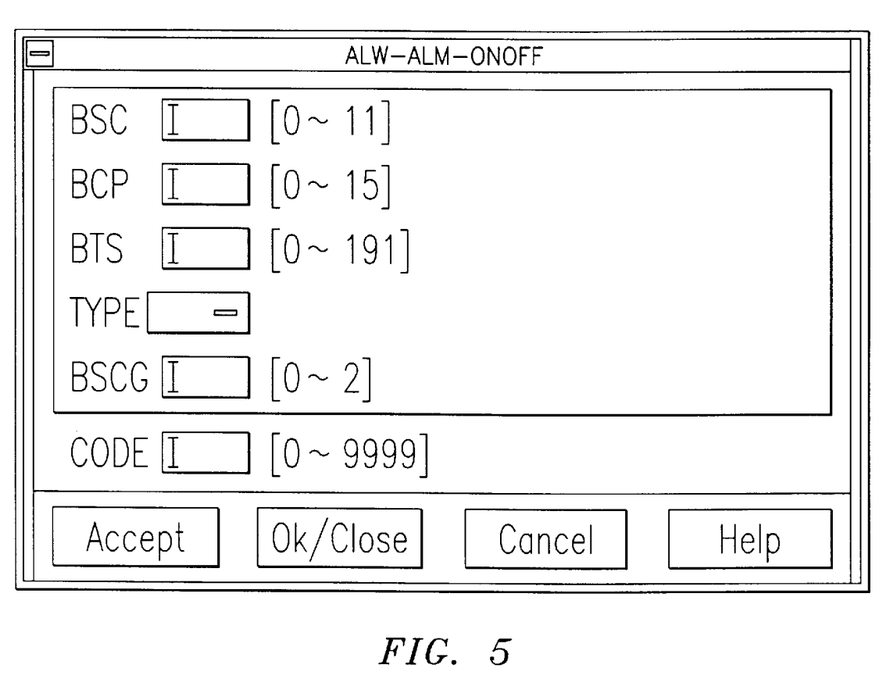
FIG. 5 is a diagram illustrating a message window when an Allowance Alarm On/Off (ALW-ALM-ONOFF) command is applied according to an embodiment of the present invention.

Referring to FIG. 5, a diagram is shown illustrating a message window when an Allowance Alarm On/Off (ALW- ALM-ONOFF) command is applied according to an embodiment of the present invention. The TYPE button corresponds to the range of the system to allow alarm handling (i.e., step 2100). In order to allow alarm handling with respect to the entire system, "all" is selected in the TYPE button. In order to allow alarm handling with respect to the BSCC alarm, "BSCC" is selected in the TYPE button. The BSCC alarm corresponds to the device and processor which are commonly equipped with the CBS (CDMA BSS System) which, in turn, is associated with twelve BSCs.

Moreover, to allow all of the alarms of a specific BSC, BCP or BTS, the corresponding BSC, BCP or BTS value is respectively inputted to the BSC, BCP or BTS box. The BTS value may also be computed using BSC_ID×16+BCP_ID. Additionally, to allow all of the alarms of a specific BSCG, the corresponding BSCG value is inputted to the BSCG box. The BSCG alarm corresponds to the device and processor which are commonly equipped with the CBS (CDMA BSS System) which, in turn, is associated with four BSCs. Thus, to allow a specific alarm using the above described procedure, the corresponding alarm code is inputted to the code box.

Figure 3:
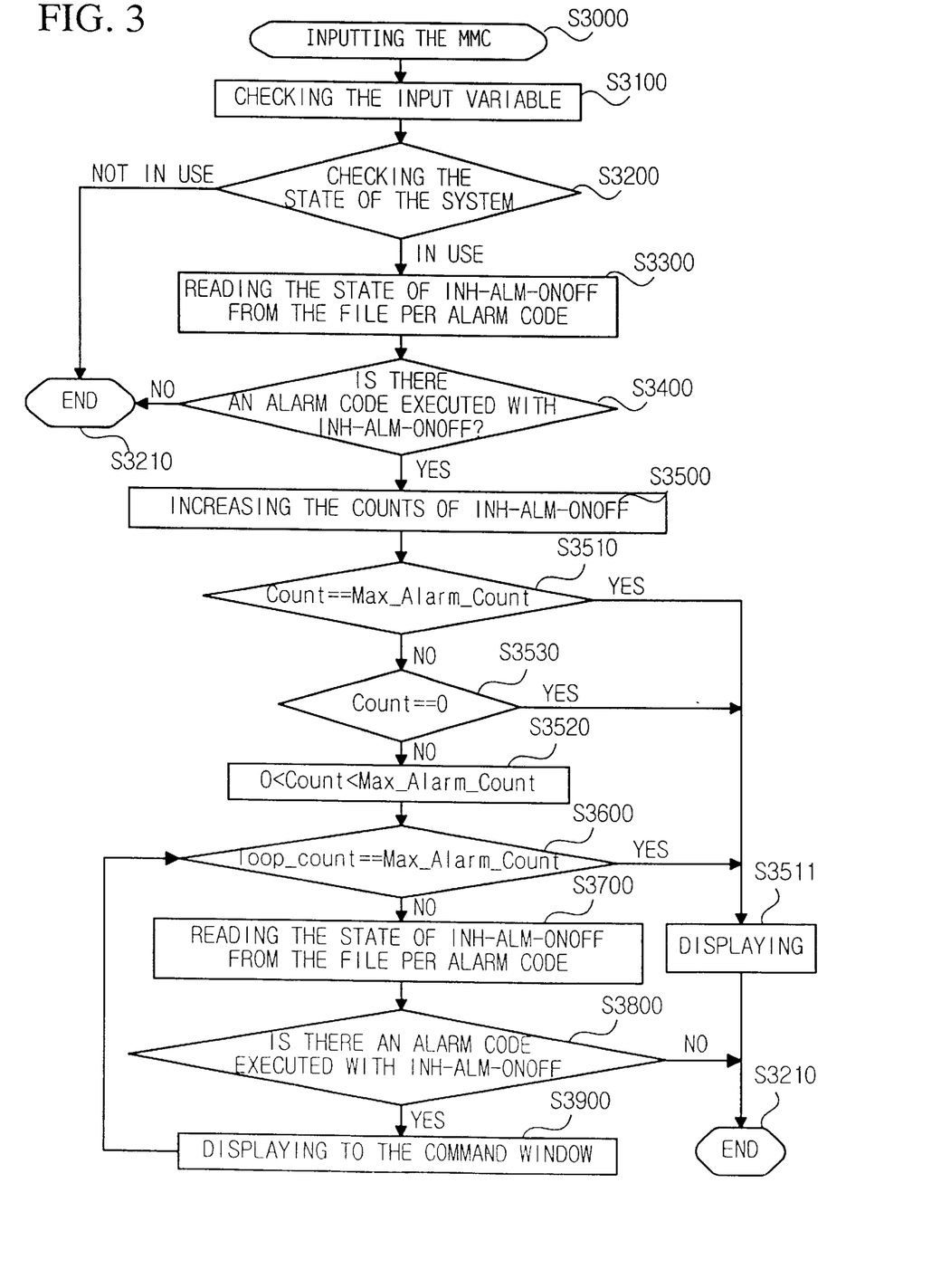
FIG. 3 is a flow chart of a method for displaying the case wherein alarm handling is inhibited in a digital cellular system according to an embodiment of the present invention.

Referring to FIG. 3, a method is provided for displaying the case wherein alarm handling is inhibited in a digital cellular system according to an embodiment of the present invention. The method of FIG. 3 is performed by the fault management (FLM) block in the case when a Display Alarm On/Off (DIS-ALM-ONOFF) command is applied. The method includes the step of inputting a man machine command (MMC) (i.e., the DIS-ALM-ONOFF command) to a base station manager (BSM) (step 3000). The range of the system to display the case wherein alarm handling is inhibited is setup, the type of alarm to be displayed is setup, and an option of the inputted variables corresponding to the setting up of the range of the system and the type of the alarm are checked (step 3100). The range of the system to display the case wherein alarm handling is inhibited corresponds to a component group or groups (e.g., BSC, BCP, BTS) of the digital cellular system (as well as the entire system itself) whose alarms are inhibited, and the fact of such inhibition is sought to be displayed. The option of the inputted variables corresponds to the specific components within a group (e.g., the eleventh BSC) that are to have the fact displayed that their alarm handling is inhibited. The range and option are discussed in further detail with respect to FIG. 6. The state of equipment of program loaded data (PLD) is checked to determine whether or not the component group (or groups) corresponding to the range is in use (step 3200). That is, the state of equipment of PLD is checked to determine whether or not the component group (or groups) to perform commands corresponding to displaying inhibited alarm handling is in use. The data per alarm code is read from a file which stores the alarm-handling allowance information, when the system to perform the commands is in use (step 3300).

Next, it is determined whether or not an alarm code performed with the Inhibit Alarm On/Off (INH-ALM-ONOFF) command exists (step 3400). Counts of the INH-ALM-ONOFF command are increased, when an alarm code performed with an INH-ALM-ONOFF command exists (step 3500). However, the method (i.e., the DIS-ALM-ONOFF process) is terminated, when an alarm code performed with an INH-ALM-ONOFF command does not exist (step 3210).

Next, it is determined whether or not the INH-ALM-ONOFF command has been read as many times as the maximum count (Max_Alarm_Count) (step 3505). The counts are compared to threshold values, when it is determined that the INH-ALM-ONOFF command has been read as many times as Max_Alarm_Count (step 3510) (step 3530) (step 3520). The data is displayed to the administrator, when the counts are equal to 0 (zero) or the maximum count (Max_Alarm_Count) (step 3511). A result performed with the INH-ALM-ONOFF command is displayed to the command window according to the commands inputted to the MMC, when the counts are between 0 and the maximum count (step 3900).

If it is determined at step 3200 that the system to perform the commands is not in use, then the DIS-ALM-ONOFF process is terminated (step 3210). If the counts are between 0 and the maximum count, then the inhibited results are read per alarm code from the file to which the inhibition information of the alarm handling is stored (step 3700). Then, the fact of whether or not an alarm code executed with the INH-ALM-ONOFF command exists is checked (step 3800). The step of displaying the result performed with the INH-ALM-ONOFF command to the command window according to the commands inputted to the MMC (step 3900) is iterated as many times as the above-noted maximum count of step 3600, when an alarm code executed with the INH-ALM-ONOFF command exists.

After this algorithm is executed, the result performed with the INH-ALM-ONOFF command can be displayed to the command window according to the inputted commands.

Figure 6:
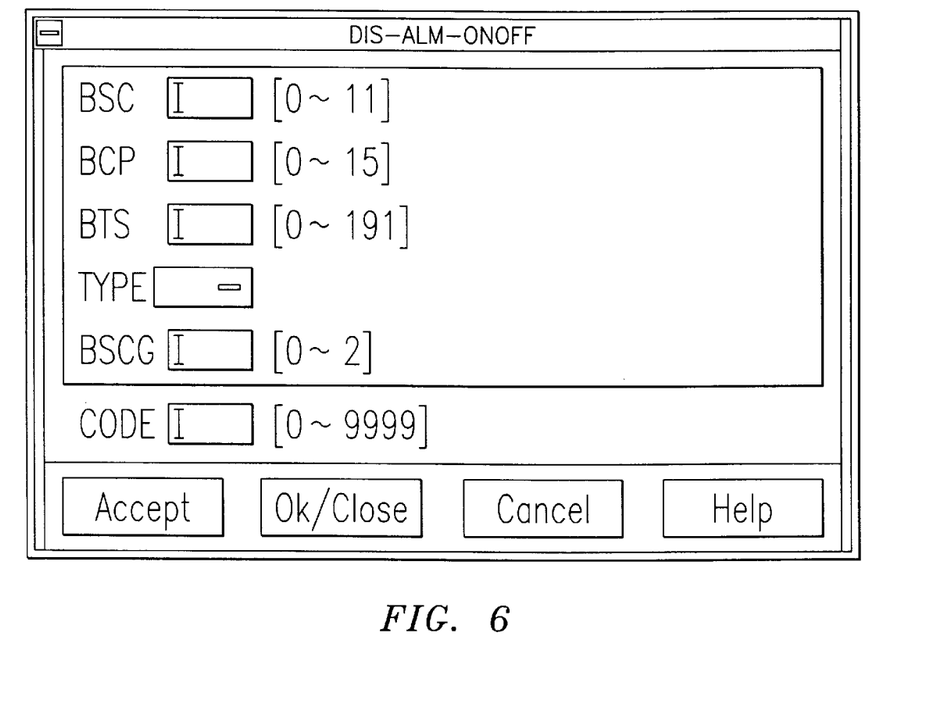
FIG. 6 is a diagram illustrating a message window when a Display Alarm On/Off (DIS-ALM-ONOFF) command is applied according to an embodiment of the present invention.

Referring to FIG. 6, a diagram is shown illustrating a message window when a Display Alarm On/Off (DIS-ALM-ONOFF) command is applied according to an embodiment of the present invention. To display alarm handling with respect to the entire system, "all" is selected in the TYPE button. In order to display alarm handling with respect to the BSCC alarm, "BSCC" is selected in the TYPE button. The BSCC alarm corresponds to the device and processor which are commonly equipped with the CBS (CDMA BSS System) which, in turn, is associated with twelve BSCs.

Moreover, to display all of the alarms of a specific BSC, BCP or BTS, the corresponding BSC, BCP or BTS value is respectively inputted to the BSC, BCP or BTS box. The BTS value may also be computed using BSC_ID×16+BCP_ID. Additionally, to display all of the alarms of a specific BSCG, the corresponding BSCG value is inputted to the BSCG box. The BSCG alarm corresponds to the device and processor which are commonly equipped with the CBS (CDMA BSS System) which, in turn, is associated with four BSCs. Thus, to display a specific alarm using the above described procedure, the corresponding alarm code is inputted to the code box.

Figure 7:
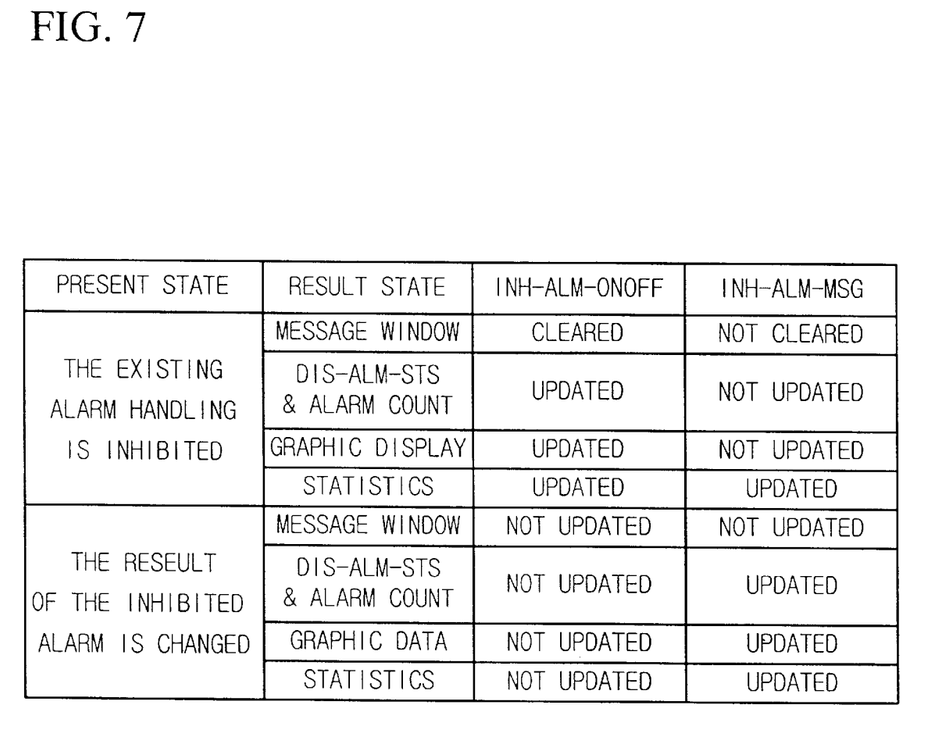
FIG. 7 is a table comparing the performance results of an Inhibit Alarm Message (INH-ALM-MSG) with the INH-ALM-ONOFF command.

FIG. 7 is a table comparing the performance results of an Inhibit Alarm Message (INH-ALM-MSG) with the INH-ALM-ONOFF command. The table is shown in a message window which displays the present state of the system in realtime mode. The Display Alarm Status (DIS-ALM-STS) command makes the command window display the alarm state of the system. The command Alarm Count makes the command window display the counted number of existing alarms. The graphic window displays the present state of the system with colors. For example, green represents a normal state and red represents a critical state. The statistics display the entire state of the system in a statistical method.

Regarding the first of two present states of the system shown in FIG. 7, that is, the state when "the existing alarm handling is inhibited", the message window is cleared, and the DIS-ALM-STS command, Alarm Count, graphic window, and statistics are updated, when the INH-ALM- ONOFF command is performed. When the command INH-ALM-MSG is performed, the statistics are updated.

Regarding the second of the two present states shown in FIG. 7, that is, the state when "the result of the inhibited alarm is changed", the DIS-ALM-STS command, Alarm Count, graphic window, and statistics are updated, when the INH-ALM-MSG command is performed.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for inhibiting alarm handling in a digital cellular system, comprising the steps of:

(a) inputting an Inhibit Alarm On/Off (INH-ALM-ONOFF) command in a base station manager (BSM);

(b) setting up a range of a system to inhibit the alarm handling;

(c) setting up a type of an alarm to be inhibited;

(d) checking an option of inputted variables corresponding to said steps of setting up the range of the system and the type of the alarm;

(e) checking a state of equipment of program loaded data (PLD) to determine whether one of a component group and components groups of the digital cellular system corresponding to the range is in use;

(f) determining whether the alarm has occurred;

(g) reducing counts by as many times as occurrences of the alarm and clearing the alarm, when the alarm has occurred;

(h) determining whether the alarm is performed with an Inhibit Alarm Message (INH-ALM-MSG);

(i) displaying a "clear" message, when the alarm is not performed with the INH-ALM-MSG;

(j) recovering graphic data located at a position where the alarm has occurred by updating the graphic data; and (k) storing a result to which the INH-ALM-ONOFF command is applied to a file to display the result when a Display Alarm On/Off (DIS-ALM-ONOFF) command is performed.

2. The method of claim 1, wherein the range corresponds to at least one of a BSC common (BSCC), a BSC group (BSCG), a group of base station controllers (BSCs), a group of BTS control processors (BCPs), and the entire digital cellular system.

3. The method of claim 1, further comprising the step of terminating the INH-ALM-ONOFF command, when the system to perform the command is not in use.

4. The method of claim 1, wherein said step of determining whether the alarm is performed with the INH-ALM-MSG, is performed when it is determined that the alarm had not occurred.

5. The method of claim 1, wherein said step of recovering the graphic data, is performed when it is determined that the alarm is performed with the INH-ALM-MSG.

6. A method for allowing alarm handling in a digital cellular system, comprising the steps of:

(a) inputting an Allowance Alarm On/Off (ALW-ALM-ONOFF) command in a base station manager (BSM);

(b) setting up a range of a system to allow the alarm handling;

(c) setting up a type of an alarm to allow alarm handling;

(d) checking an option of inputted variables corresponding to said steps of setting up the range and the type of the alarm;

(e) checking a state of equipment of program loaded data (PLD) to determine whether one of a component group and components groups of the digital cellular system corresponding to the range is in use;

(f) storing a result of performing the ALW-ALM-ONOFF command, when the system is in use; and (g) terminating the ALW-ALM-ONOFF command, when the system is not in use.

7. The method of claim 6, wherein the range corresponds to at least one of a BSC common (BSCC), a BSC group (BSCG), a group of base station controllers (BSCs), a group of BTS control processors (BCPs), and the entire digital cellular system.

8. A method for displaying when an alarm handling is inhibited in a digital cellular system, comprising the steps of:

(a) inputting a display alarm on/off (DIS-ALM-ONOFF) command in a base station manager (BSM);

(b) setting up a range of a system to display a situation wherein the alarm handling is inhibited;

(c) setting up a type of an alarm to be displayed;

(d) checking an option of inputted variables corresponding to said steps of setting up the range and the type of the alarm;

(e) checking a state of equipment of program loaded data (PLD) to determine whether one of a component group and components groups of the digital cellular system corresponding to the range is in use;

(f) reading data corresponding to the alarm from a file which stores alarm-handling allowance information, when the system to perform the commands is in use;

(g) checking whether the alarm performed with an inhibit alarm on/off (INH-ALM-ONOFF) command exists;

(h) increasing counts of the INH-ALM-ONOFF command, when the alarm performed with the INH-ALM-ONOFF command exists;

(i) terminating the DIS-ALM-ONOFF command, when the alarm performed with the INH-ALM-ONOFF command does not exist;

(j) determining whether the INH-ALM-ONOFF command has been read as many times as a maximum count (Max_ Alarm_ Count);

(k) comparing the counts with threshold values, when the INH-ALM-ONOFF command has been read as many times as the maximum count;

(l) displaying the data to an administrator, when the counts are equal to one of 0 and the maximum count; and (m) displaying a result performed with the INH-ALM-ONOFF command to a command window according to the commands which are inputted to the MMC, when the counts are between 0 and the maximum count.

9. The method of claim 8, wherein the range corresponds to at least one of a BSC common (BSCC), a BSC group (BSCG), a group of base station controllers (BSCs), a group of BTS control processors (BCPs), and the entire digital cellular system.

10. The method of claim 8, further comprising the step of terminating the DIS-ALM-ONOFF command, when the system is not in use.

11. The method of claim 10, wherein when the counts are between 0 and the maximum count, the method further comprises the steps of:

reading the data per alarm from the file which stores the alarm-handling allowance information;

checking whether the alarm performed with the INH-ALM-ONOFF command exists; and iterating said step of displaying the result performed with the INH-ALM-ONOFF command by a number of times equal to the maximum count, when the alarm performed with the INH-ALM-ONOFF command exists.

* * * * *